(12) United States Patent
Ramsay et al.

(10) Patent No.: US 10,908,686 B2
(45) Date of Patent: Feb. 2, 2021

(54) SYSTEMS AND METHODS FOR PRE-TOUCH AND TRUE TOUCH

(75) Inventors: Erin Ramsay, Dollard-des-Ormeaux (CA); Pedro Gregorio, Verdun (CA)

(73) Assignee: Immersion Corporation, San Francisco, CA (US)

( * ) Notice: Subject to any disclaimer, the term of this patent is extended or adjusted under 35 U.S.C. 154(b) by 1742 days.

(21) Appl. No.: 13/046,263

(22) Filed: Mar. 11, 2011

(65) Prior Publication Data

US 2012/0056825 A1 Mar. 8, 2012

Related U.S. Application Data

(60) Provisional application No. 61/314,337, filed on Mar. 16, 2010.

(51) Int. Cl.
*G06F 3/01* (2006.01)
*G06F 3/0488* (2013.01)

(52) U.S. Cl.
CPC ............ *G06F 3/016* (2013.01); *G06F 3/0488* (2013.01)

(58) Field of Classification Search
None
See application file for complete search history.

(56) References Cited

U.S. PATENT DOCUMENTS 5,311,175 A * 5/1994 Waldman ................... 341/34
6,715,045 B2 * 3/2004 Braun et al. ............... 711/154

| | | |
|---|---|---|
| 7,890,863 B2 | 2/2011 | Grant et al. |
| 2004/0257339 A1 | 12/2004 | Takahashi |
| 2006/0152497 A1 | 7/2006 | Rekimoto |

(Continued)

FOREIGN PATENT DOCUMENTS

| | | |
|---|---|---|
| EP | 2141580 | 1/2010 |
| EP | 2209060 | 7/2010 |

(Continued)

OTHER PUBLICATIONS

Japanese Patent Office, Office Action, Japanese Application No. 2015-229420, dated Feb. 28, 2017.

(Continued)

*Primary Examiner* — Andre L Matthews
(74) *Attorney, Agent, or Firm* — Kilpatrick Townsend & Stockton LLP (57) ABSTRACT

Systems and methods for pre-touch and true touch are disclosed. For example, in one described system for pre-touch and true touch includes a touch-sensitive interface configured to detect a user interaction and transmit a first interface signal based at least in part on the user interaction. The system also includes a processor in communication with the touch-sensitive interface and configured to receive the first interface signal and determine a haptic effect based at least in part on the first interface signal. The processor is further configured to preload a haptic signal associated with the haptic effect. The system also includes a cache in communication with the processor and configured to store the preloaded haptic signal for a time period and then transmit the haptic signal and a haptic effect generator in communication with the cache and configured to receive the haptic signal from the cache and, in response, output a haptic effect based at least in part on the haptic signal.

20 Claims, 5 Drawing Sheets

(56) References Cited

U.S. PATENT DOCUMENTS

| | | | |
|---|---|---|---|
| 2007/0070044 A1* | 3/2007 | Yeh | G06F 3/0202 |
| | | | 345/169 |
| 2008/0238886 A1 | 10/2008 | Bengtsson et al. | |
| 2009/0140996 A1* | 6/2009 | Takashima | G06F 1/1626 |
| | | | 345/173 |
| 2009/0322497 A1 | 12/2009 | Ku et al. | |
| 2010/0004033 A1 | 1/2010 | Choe et al. | |
| 2010/0079264 A1* | 4/2010 | Hoellwarth | 340/407.2 |
| 2011/0138277 A1 | 6/2011 | Grant et al. | |
| 2011/0164063 A1* | 7/2011 | Shimotani | G06F 3/0416 |
| | | | 345/661 |
| 2013/0249859 A1 | 9/2013 | Park et al. | |
| 2017/0285848 A1 | 10/2017 | Rosenberg et al. | |
| 2017/0300166 A1 | 10/2017 | Rosenberg et al. | |

FOREIGN PATENT DOCUMENTS

| | | |
|---|---|---|
| EP | 2887187 | 6/2015 |
| JP | H06-43998 | 2/1994 |
| JP | 2008-123431 | 5/2008 |
| KR | 10-2010-0002776 | 1/2010 |
| WO | WO 2008/042745 | 4/2008 |

OTHER PUBLICATIONS

Korean Patent Office, Notice of Preliminary Rejection, Korean Application No. 10-2011-0022088, dated Jan. 23, 2017.
Korean Patent Office, Notice of Preliminary Rejection, Korean Application No. 10-2011-0022088, dated May 12, 2016.
Japanese Patent Office, Notice of Reasons for Rejection, Japanese Application No. JP 2011-054157, dated Dec. 16, 2014.

* cited by examiner

SYSTEMS AND METHODS FOR PRE-TOUCH AND TRUE TOUCH

CROSS-REFERENCE TO RELATED APPLICATION

This patent application claims priority to U.S. Provisional Patent Application No. 61/314,337, entitled "Systems and Methods for Pre-Touch and True Touch," filed Mar. 16, 2010, which is incorporated by reference herein in its entirety.

FIELD OF THE INVENTION

The present invention generally relates to haptic feedback and more particularly to systems and methods for pre-touch and true touch.

BACKGROUND

In recent years, the use of handheld devices of all types has grown exponentially. These devices are used as portable organizers, telephones, music players, and gaming systems. Many modern handheld devices now incorporate some type of haptic feedback. In some handheld devices haptic feedback is not output as quickly as is preferable. Thus there is a need for systems and methods of pre-touch and true touch.

SUMMARY

Embodiments of the present invention provide systems and methods for pre-touch and true touch. For example, in one embodiment, a system for pre-touch and true touch comprises: a touch-sensitive interface configured to detect a user interaction and transmit a first interface signal based at least in part on the user interaction; a processor in communication with the touch-sensitive interface and configured to receive the first interface signal and determine a haptic effect based at least in part on the first interface signal, the processor further configured to preload a haptic signal associated with the haptic effect; a cache in communication with the processor and configured to store the preloaded haptic signal for a time period, then transmit the haptic signal; and a haptic effect generator in communication with the cache and configured to receive the haptic signal from the cache and output a haptic effect based at least in part on the haptic signal.

This illustrative system is mentioned not to limit or define the invention, but rather to provide an example to aid understanding thereof. Illustrative systems and methods are discussed in the Detailed Description, which provides further description of the invention. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention provide systems and methods for pre-touch and true touch.

Illustrative Embodiment of Pre-Touch and True Touch

One illustrative embodiment of the present invention comprises a handheld device, such as a mobile phone. The illustrative handheld device comprises the Samsung Haptic Phone (SCH-W420) equipped with Immersion Corporation's TouchSense® 3000, TouchSense® 4000, or TouchSense® 5000 vibrotactile feedback systems, formerly known as Immersion Corporation's VibeTonz® vibrotactile feedback system. In other embodiments, different handheld devices and haptic feedback systems may be utilized.

The illustrative handheld device comprises a display, a speaker, a network interface, a memory, a cache, and a processor in communication with each of these elements. The illustrative handheld device also comprises a touch-sensitive interface and an haptic effect generator, both of which are in communication with the processor. The touch-sensitive interface is configured to sense a user's interaction with the handheld device and the haptic effect generator is configured to output a haptic effect. The illustrative handheld device may further comprise a manipulandum, such as a scroll wheel, keyboard, or buttons, configured to detect a user interaction and transmit an interface signal associated with the user interaction to the processor.

In the illustrative handheld device, the display is configured to display a graphical user interface to the user. The graphical user interface may comprise virtual objects, for example icons, buttons, or a virtual keyboard. The illustrative handheld device further comprises a touch-sensitive interface, such as a touch-screen, mounted overtop of the display. The touch-sensitive interface, allows the user to interact with the virtual objects displayed in the graphical user interface. For example, the graphical user interface may comprise a virtual keyboard. In such an embodiment, the touch-sensitive interface allows the user to touch a key on the virtual keyboard to press that key. This functionality may be used to type messages, or otherwise interact with objects in the graphical user interface.

The illustrative handheld device further comprises an haptic effect generator configured to receive a haptic signal and output a haptic effect. The haptic effect may comprise one of several haptic effects known in the art, for example, vibrating, knocking, buzzing, jolting, or torquing the handheld device. In the illustrative handheld device, the haptic effect may act as a confirmation that the processor has received a signal associated with user interaction from the touch-sensitive interface. For example, the graphical user interface may comprise a button, and the touch-sensitive interface may detect user interaction associated with pressing the button and transmit an interface signal to the processor. In response, the processor may determine a haptic effect to confirm that it received the interface signal. The processor will then preload the haptic signal associated with the haptic effect to a cache. The cache will store the haptic signal for a period of time and then transmit the haptic signal to the haptic effect generator, which outputs the haptic effect.

In the illustrative handheld device, the touch-sensitive interface or an associated sensor is capable of detecting the user interaction before the user touches the surface of the touch-sensitive interface. User interaction that does not make physical contact with the touch-screen may be referred to herein as a pre-touch. Based on the pre-touch, the touch-screen transmits a first interface signal to the processor. In the illustrative handheld device, the touch-screen is also configured to detect when the user makes physical contact with the touch-screen. User interaction that makes physical contact with the touch-screen may be referred to herein as a true touch. Based on the true touch, the touch-screen transmits a second interface signal to the processor.

In the illustrative handheld device, when the processor receives the first interface signal, associated with the pre-touch, the processor is configured to determine a haptic effect. Then the processor transmits a haptic signal associated with the haptic effect to a cache configured to store the haptic signal. Then when the processor receives the second interface signal, associated with the true touch, the processor transmits a signal to the cache, which causes the cache to transmit the haptic effect to the haptic effect generator. Using a cache to preload a haptic effect based on a pre-touch, and then output the haptic effect based on the true touch, allows the illustrative handheld device to output a haptic effect very close to the time the user makes physical contact with the touch-screen. This functionality reduces the risk that the illustrative handheld device will output a "late effect" after the user is no longer touching the touch-screen. This allows the illustrative handheld device to output more compelling haptic effects than other devices known in the art.

This illustrative example is given to introduce the reader to the general subject matter discussed herein. The invention is not limited to this example. The following sections describe various additional non-limiting embodiments and examples of systems and methods for pre-touch and true touch.

Illustrated System for Pre-Touch and True Touch

Figure 1:
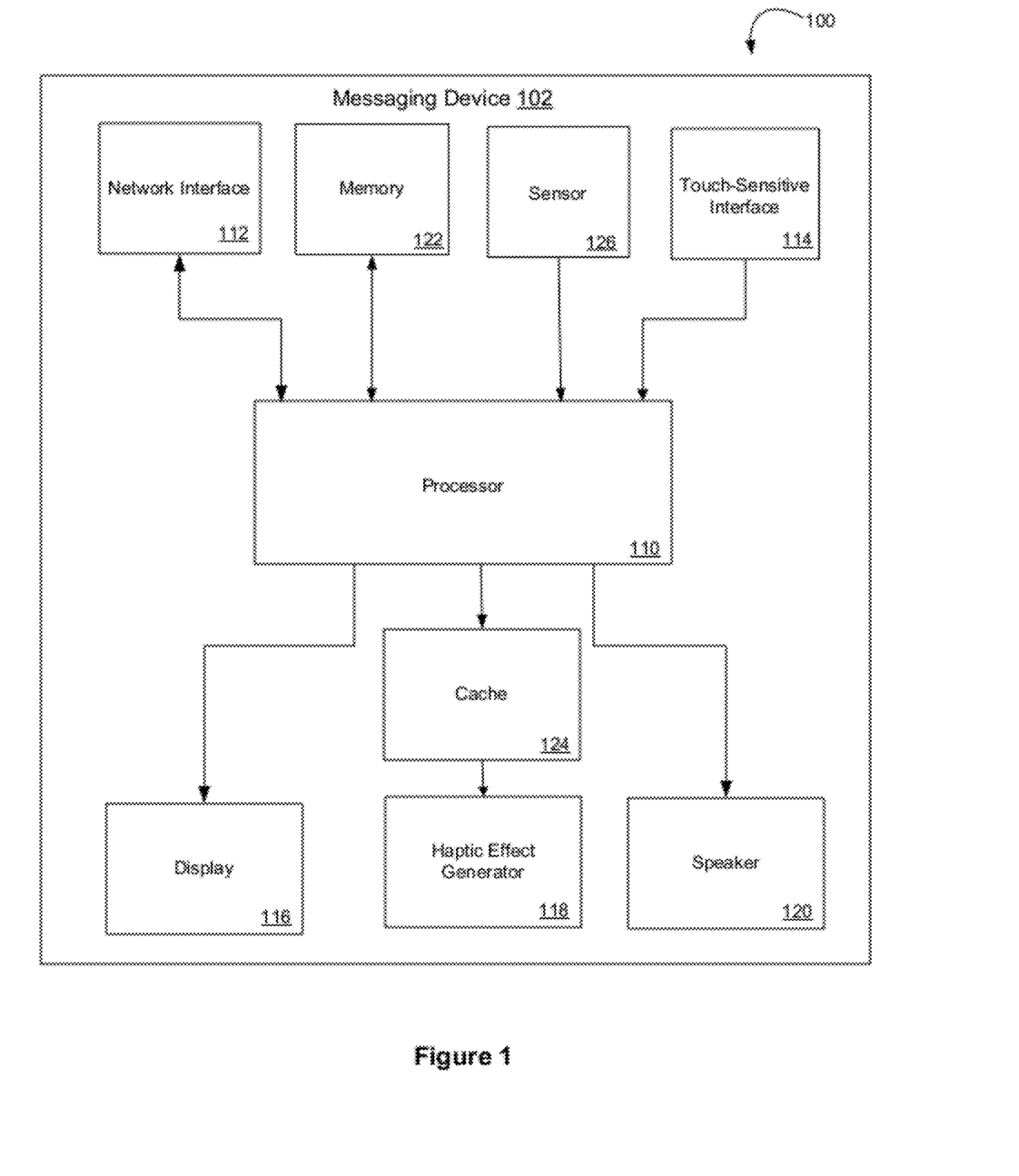
FIG. 1 is a block diagram of a system for pre-touch and true touch according to one embodiment of the present invention.

Referring now to the drawings in which like numerals indicate like elements throughout the several figures, FIG. 1 is a block diagram of a system for pre-touch and true touch according to one embodiment of the present invention. As shown in FIG. 1, the system 100 comprises a handheld device 102, such as a mobile phone, portable digital assistant (PDA), portable media player, portable computer, messaging device, or portable gaming device. In some embodiment, handheld device 102 comprises a larger device, for example a laptop or desktop computer, a television, or monitor. The handheld device 102 comprises a processor 110 in communication with a network interface 112, a touch-sensitive interface 114, a display 116, a haptic effect generator 118, a speaker 120, a memory 122, a cache 124, and a sensor 126. The processor 110 is configured to generate a graphical user interface, which is shown on display 116.

The processor 110 is configured to execute computer-executable program instructions stored in memory 122. For example, processor 110 may execute one or more computer programs for messaging or for generating haptic feedback. Processor 110 may comprise a microprocessor, a digital signal processor (DSP), an application-specific integrated circuit (ASIC), one or more field programmable gate arrays (FPGAs), or state machines. Processor 110 may further comprise a programmable electronic device, such as a programmable logic controller (PLC), a programmable interrupt controller (PIC), a programmable logic device (PLD), a programmable read-only memory (PROM), an electronically programmable read-only memory (EPROM or EEPROM), or other similar devices.

Memory 122 comprises a computer-readable medium that stores instructions, which when executed by processor 110, cause processor 110 to perform various steps such as those described herein. Embodiments of computer-readable media may comprise, but are not limited to, an electronic, optical, magnetic, or other storage or transmission devices capable of storing and providing processor 110 with computer-executable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. In addition, various other devices may include computer-readable media such as a router, private or public network, or other transmission devices. The processor 110 and the processing described may be in one or more structures and may be dispersed throughout one or more structures.

The processor 110 is in communication with a network interface 112. Network interface 112 may comprise one or more methods of mobile communication, such as infrared, radio, Wi-Fi, or cellular network communication. In other variations, the network interface 112 comprises a wired network interface, such as Ethernet. The handheld device 102 can be configured to exchange messages or virtual message objects with other devices (not shown) over networks, such as a cellular network and/or the Internet. Embodiments of messages exchanged between devices may comprise voice messages, text messages, data messages, or other forms of digital messages.

The processor 110 is also in communication with one or more touch-sensitive interfaces 114. The touch-sensitive interface 114 may comprise a touch-sensitive input device (e.g. touch-screen, touch-pad) or some other type of physical device interface known in the art. In some embodiments, the processor is in communication with a single touch-sensitive interface 114. In other embodiments, the processor is in communication with a plurality of touch-sensitive interfaces, for example, a touch-screen and a touch-pad. Touch-sensitive interface 114 is configured to detect user interaction and, based on the user interaction, transmit interface signals to processor 110.

In the embodiment shown in FIG. 1, the processor 110 is also in communication with a display 116. The processor 110 can be configured to generate a graphical representation of a user interface to be shown on display 116, and then transmit a display signal to display 116. In other embodiments, display 116 is configured to receive a display signal from another device. For example, in some embodiments, display 116 may comprise an external display such as a computer monitor. Display 116 is configured to receive a display signal and output an image associated with that display signal. In some embodiments, the display signal may comprise a vga, hdmi, svga, video, s-video, or other type of display signal known in the art. In some embodiments, display 116 comprises a flat screen display, such as a Liquid Crystal Display (LCD) or Plasma Screen Display. In other embodiments display 116 comprises a Cathode Ray Tube (CRT) or other type of display known in the art. In some embodiments, the display 116 may comprise touch-sensitive interface 114. In such an embodiment, the touch-sensitive interface 114 may comprise a touch-screen mounted overtop of display 116. In some embodiments, touch-sensitive interface 114 and display 116 may comprise a single integrated component, such as a touch-screen LCD.

In some embodiments, the signals received from touch-sensitive interface 114 may be associated with an interaction with the graphical user interface shown on display 116. For example, in one embodiment, touch-sensitive interface 114 may comprise a touch-screen, and the graphical user interface may comprise a virtual keyboard. In such an embodiment, when the user interacts with a section of the touch-screen that overlays one of the keys of the keyboard, the touch-screen sends a signal to processor 110 corresponding to the user interaction. Based on this signal, processor 110 will determine that the user has pressed one of the keys on the virtual keyboard. In some embodiments, this functionality may be used to type messages, such as text messages and emails. Such an embodiment may further allow the user to interact with other icons and virtual objects on the display. For example, in some embodiments the user may flick a touch-screen to move a virtual ball, or turn a virtual knob on a touch-screen. In some embodiments, not shown in FIG. 1, the handheld device may comprise an additional manipulandum, such as a scroll wheel, roller ball, or button that facilitates similar interactions between the user and the graphical user interface.

Touch-sensitive interface 114 is configured to detect two types of user interaction. First touch-sensitive interface 114 is configured to detect a pre-touch. A pre-touch may comprise user interaction prior to the user making physical contact with touch-sensitive interface 114. In some embodiments, touch-sensitive interface 114 may detect a pre-touch when the user is within a few centimeters off its surface, for example any interaction within 3 cm. In other embodiments, touch-sensitive interface 114 may detect a pre-touch when the user is closer to user interface, for example within ½ cm. In other embodiments, touch-sensitive interface 114 may detect a pre-touch when the user first makes contact with the touch-sensitive interface, but has not applied pressure to touch-sensitive interface 114. In other embodiments, touch-sensitive interface 114 may detect a pre-touch when the user has made contact with touch-sensitive interface 114, but less than a threshold surface area of skin is contacting touch-sensitive interface 114. For example, touch-sensitive interface 114 may detect a pre-touch when the user has contacted touch-sensitive interface 114, but less than 0.2 cm$^2$ of skin is in contact with touch-sensitive interface 114. In still other embodiments, touch-sensitive interface 114 may detect a pre-touch when the user has made contact with touch-sensitive interface 114, but the contact has not lasted for a threshold length of time. For example, when the user has contacted the touch-sensitive interface, but has not yet stayed in contact with touch-sensitive interface 114 for 0.02 seconds. In some embodiments, touch-sensitive interface 114 may detect the pre-touch by detecting a change in capacitance. For example, in such an embodiment touch sensitive interface 114 may comprise a capacitive touch-screen. In another embodiment, touch-sensitive interface 114 may detect the pre-touch by detect a change in the resistance. For example, in such an embodiment touch-sensitive interface 114 may comprise a resistive touch-screen. When touch-sensitive interface 114 detects a pre-touch, it transmits a first interface signal to processor 110.

In some embodiments, processor 110 is also in communication with one or more sensors 126. Sensor 126 comprises a sensor configured to detect user interaction over the surface of touch-sensitive interface 114 or display 116, such as user interaction comprising a pre-touch. Based on this user interaction, sensor 126 will send a corresponding sensor signal to processor 110. Sensor 126 may comprise, for example, an optic, infrared, motion sensor, or some other sensor known in the art.

Touch-sensitive interface 114 is also configured to detect a true touch. The true touch may comprise user interaction that makes physical contact with the touch-sensitive interface. For example, in one embodiment, a true touch occurs when the user puts his or her finger on the surface of touch-sensitive interface 114. In such an embodiment, touch-sensitive interface 114 may detect a true touch when a threshold of skin surface area in contact with touch-sensitive interface 114 is crossed, for example, when more than 0.2 cm$^2$ of skin is in contact with touch-sensitive interface 114. In other embodiments, touch-sensitive interface 114 may detect a pre-touch when the user first contacts touch-sensitive interface 114. In such an embodiment, touch-sensitive interface 114 may detect a true touch when the user applies a certain amount of force to touch-sensitive interface 114, for example, 0.2N. In such an embodiment, touch-sensitive interface 114 may further comprise a force sensor, such as a mechanical or pneumatic pressure sensor. For example, in such an embodiment, touch-sensitive interface 114 may comprise a capacitive touch-screen configured to detect a pre-touch, and further comprise a pressure sensor configured to detect a true touch. In other embodiments, touch-sensitive interface 114 may comprise a plurality of manipulanda, for example a button or switch and a touch-screen. In such an embodiment, the button may be configured to detect a pre-touch, and the touch-screen may be configured to detect a true touch. In other embodiments, the touch-screen may be configured to detect a pre-touch, and the button may be configured to detect a true touch. When touch sensitive interface 114 detects a true touch, it transmits a second interface signal to processor 110.

As shown in FIG. 1, processor 110 is also in communication with a cache 124. Cache 124 is configured to receive the haptic signal from processor 110 and store or preload the haptic signal for a period of time. In some embodiments, the period of time is fixed, for example a time of 10 ms. In other embodiments, the period of time is defined by the length of time between the pre-touch and the true touch. For example, in such an embodiment, processor 110 transmits the haptic signal to cache 124 after the touch-sensitive interface detects the pre-touch. Then, cache 124 stores the haptic signal until processor 110 receives an interface signal associated with the true touch from touch-sensitive interface 114. In some embodiments, the cache may comprise memory, such as RAM, Flash, ROM, or some other memory known in the art. In other embodiments, cache 124 may comprise a means for storing mechanical energy, for example, a flywheel or a spring. In such an embodiment, storing the haptic effect comprises rotating the flywheel and outputting the haptic effect comprises applying a brake to the flywheel. In still other embodiments, the cache and the haptic effect generator may comprise a single component. In such an embodiment, preloading the haptic signal may comprise powering the haptic effect generator to a level just below the point where the haptic effect generator outputs a perceptible haptic effect. For example, in such an embodiment, preloading the haptic signal may comprise powering an eccentric rotating mass actuator to the point just below the level necessary to break the actuator motor's coefficient of static friction. Further, in such an embodiment, transmitting the haptic signal may comprise applying additional power to the actuator, thereby causing the actuator to output the haptic effect. In such an embodiment, the additional power may comprise substantially the full power of the haptic signal. In some embodiments, cache 124 may comprise a capacitor. In such an embodiment, preloading the haptic signal may comprise charging the capacitor with power that can be used to jumpstart a haptic effect generator. In other embodiments, the capacitor could be used to provide an energy boost or "overdrive" to a haptic effect generator that is already in operation.

As shown in FIG. 1, handheld device 102 comprises one or more haptic effect generator s 118. Processor 110 is configured to determine a haptic effect and preload, or transmit a haptic signal corresponding to the haptic effect to cache 124. Cache 124 is configured to store the haptic signal for a period of time then transmit the haptic signal to haptic effect generator 118. Haptic effect generator 118 is configured to receive the haptic signal and output the haptic effect. In some embodiments, haptic effect generator 118 is further configured to output the haptic effect after discharging cache 124. For example, in some embodiments, haptic effect generator 118 may discharge the cache, and then continue outputting the haptic effect until it receives a signal from processor 110 to stop outputting the haptic effect. Haptic effect generator 118 may be an actuator, for example, a piezoelectric actuator, an electric motor, an electro-magnetic actuator, a voice coil, a linear resonant actuator, a shape memory alloy, an electro-active polymer, a solenoid, an eccentric rotating mass motor (ERM), or a linear resonant actuator (LRA). In another embodiment, haptic effect generator 118 may comprise an electrostatic generator or electrostatic display configured to generate a haptic effect. For example, in such an embodiment, the haptic effect generator 118 may use one or more films of a capacitive sheet to output a periodic electrostatic charge, which generates a force that attracts the user's finger to a surface of the haptic effect generator. For example, by generating a charge differential between the user's finger and the surface of a display or a surface of touch-sensitive interface 114. In some embodiments, this electrostatic force may be configured to control friction between the user's finger and the haptic effect generator. This friction may simulate a texture on the surface of the display, or some other haptic effect.

In some embodiments, after detecting the pre-touch, touch-sensitive interface 114 may never detect a true touch. In such an embodiment, processor 110 may be configured to wait a predetermined time period, and then send an instruction to the cache 124 to discharge the haptic effect slowly so that no effect is perceptible to the user of the device 100. For example, processor 110 may be configured to slowly discharge the contents of a capacitor, allow the speed of the flywheel to decrease, or delete the haptic signal stored in a memory. In such an embodiment, the cache 124 is discharged without outputting the haptic effect.

As shown in FIG. 1, processor 110 is also in communication with speaker 120. Speaker 120 is configured to receive audio signals from processor 110 and output them to the user. In some embodiments, the audio signals may be associated with the haptic effect output by haptic effect generator 118, or the image output by display 116. In other embodiments, the audio signal may not correspond to the haptic effect or the image.

Figure 2:
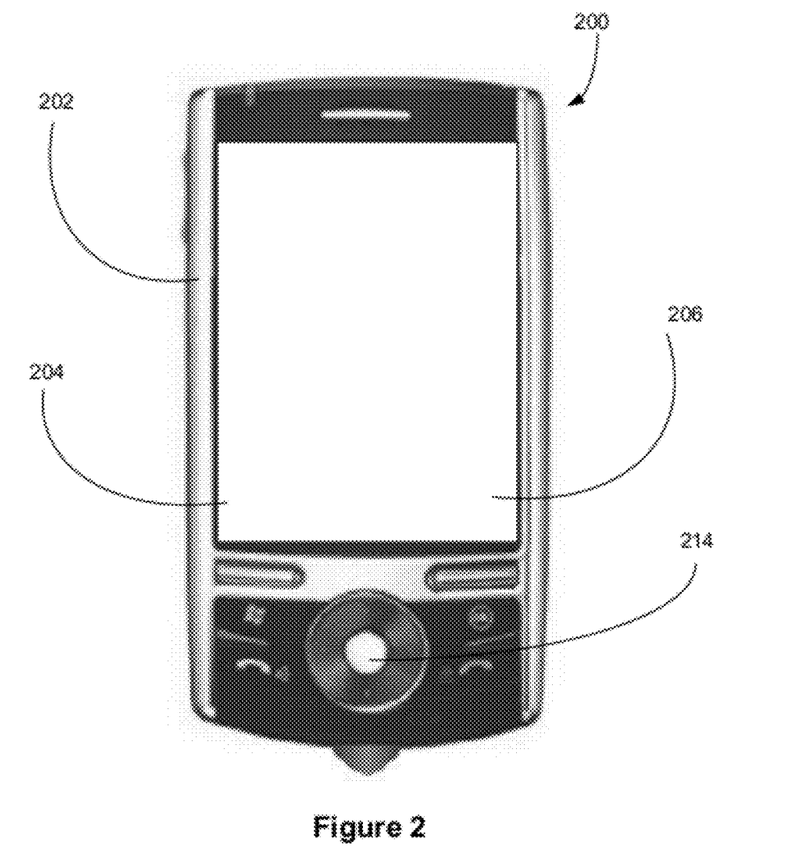
FIG. 2 is an illustrative device utilizing a system for pre-touch and true touch according to one embodiment of the present invention.

FIG. 2 is an illustrative handheld device utilizing a system for pre-touch and true touch according to one embodiment of the present invention. FIG. 2 comprises a handheld device 200, such as a mobile phone, PDA, portable media player, global positioning system, or portable gaming device. The handheld device 200 is configured to send and receive signals, such as voicemail, text messages, and other data messages, over a network such as a cellular network or the Internet. The handheld device 200 may comprise a wireless network interface and/or a wired network interface (not shown in FIG. 2). Although the device 200 is illustrated as a handheld device in FIG. 2, other embodiments may comprise different devices, such as video game systems and/or personal computers.

As shown in FIG. 2, the handheld device 200 comprises a housing 202 and a display 206. In some embodiments, display 206 may comprise an LCD display. In other embodiments, display 206 may comprise a plasma display, or other type of display known in the art. In the embodiment shown in FIG. 2, display 206 is blank. But display 206 is configured to receive display signals from the processor and output them to the user. For example, in some embodiments these signals may comprise a graphical user interface. In such an embodiment, display 206 is configured to receive a display signal comprising the graphical user interface, and output an image comprising the graphical user interface.

Referring still to FIG. 2, the handheld device 200 further comprises a manipulandum 214. In the embodiment shown in FIG. 2, the manipulandum 214 comprises a roller ball and buttons. The handheld device 200 also comprises a touch-sensitive interface 204. In the embodiment shown in FIG. 2, the touch-sensitive interface comprises a touch-screen positioned overtop of display 206. In some embodiments, display 206 and the touch-screen may comprise a single integrated component, such as a touch-screen display.

Manipulandum 214 and touch-sensitive interface 204 are configured to detect user interaction and transmit interface signals corresponding to the user interaction to the processor. In some embodiments, the user interaction is associated with a graphical user interface shown on display 206. In such an embodiment, the processor receives the interface signal and, based at least in part on the interface signal, manipulates the graphical user interface. For example, the user may use manipulandum 214 or touch-sensitive interface 204 to depress a virtual button displayed on the graphical user interface. In another embodiment, the user may use manipulandum 214 or touch-sensitive interface 204 to navigate a set of menus in the graphical user interface.

Touch-sensitive interface 204 is configured to detect two types of user interaction. First touch-sensitive interface 204 is configured to detect a pre-touch. A pre-touch may comprise user interaction prior to the user making physical contact with the surface of touch-sensitive interface 204, user interaction that does not result in a certain threshold area of skin in contact with touch-sensitive interface 204, or user interaction that has not yet lasted for a threshold length of time. For example, the touch-sensitive interface 204 may detect user interaction a few millimeters or up to several centimeters above its surface, or detect a pre-touch when the user has made contact with touch-sensitive interface 204, but less than 0.2 cm$^2$ of skin is in contact with touch-sensitive interface 204. When touch-sensitive interface 204 detects a pre-touch, it transmits a first interface signal to a processor. Touch-sensitive interface 204 is also configured to detect a true touch. A true touch may comprise user interaction that makes physical contact with the surface of the touch-sensitive interface. In other embodiments, touch-sensitive interface 204 may detect a true touch when a certain threshold area of skin is in contact with touch-sensitive interface 204. For example, when the user puts their finger on the surface of a touch-screen, or when the touch-screen detects contact with more than 0.2 cm² of skin. When touch sensitive interface 204 detects a true touch, it transmits a second interface signal to the processor.

In some embodiments, a pre-touch and a true touch can be interpreted as two thresholds detected by touch-sensitive interface 204. For example, in one embodiment, touch-sensitive interface 204 comprises a capacitive touch-screen. In such an embodiment, touch-sensitive interface 204 may detect a pre-touch when it detects a first capacitance. Further, in such an embodiment, touch-sensitive interface 204 may detect a true touch when it detects a second capacitance that is greater or less than the first capacitance. In another embodiment, touch-sensitive interface 204 may comprise a resistive touch-screen. In such an embodiment, touch-sensitive interface 204 may detect a pre-touch when it detects a first resistance. Further, in such an embodiment, touch-sensitive interface 204 may detect a true touch when it detects a second resistance that is greater or less than the first capacitance. In other embodiments, the thresholds may be of a different type, for example voltage, current, magnetic, temperature, or data based thresholds.

When the processor receives the first interface signal, associated with the pre-touch, processor 110 determines a haptic effect. Then, the processor transmits the haptic signal to a cache (not shown in FIG. 2) configured to preload the haptic effect. Then, when the processor receives the second interface signal, associated with the true touch, it transmits a signal to the cache. Upon receiving this signal, the cache transmits the haptic signal to an haptic effect generator (not shown in FIG. 2) configured to output the haptic effect. In other embodiments, touch-sensitive interface 204 is in direct communication with the cache. In such an embodiment, touch-sensitive interface 204 is configured to transmit the signal associated with the true touch directly to the cache.

In some embodiments, after detecting the pre-touch, touch-sensitive interface 204 may never detect a true touch. In such an embodiment, the processor may be configured to wait a predetermined time period, and then send an instruction to the cache to discharge the haptic effect slowly. For example, slowly discharging the contents of a capacitor, slowly decreasing the speed of the flywheel, or deleting the haptic signal stored in a memory. In such an embodiment, the cache is discharged without outputting the haptic effect.

Figure 3A:
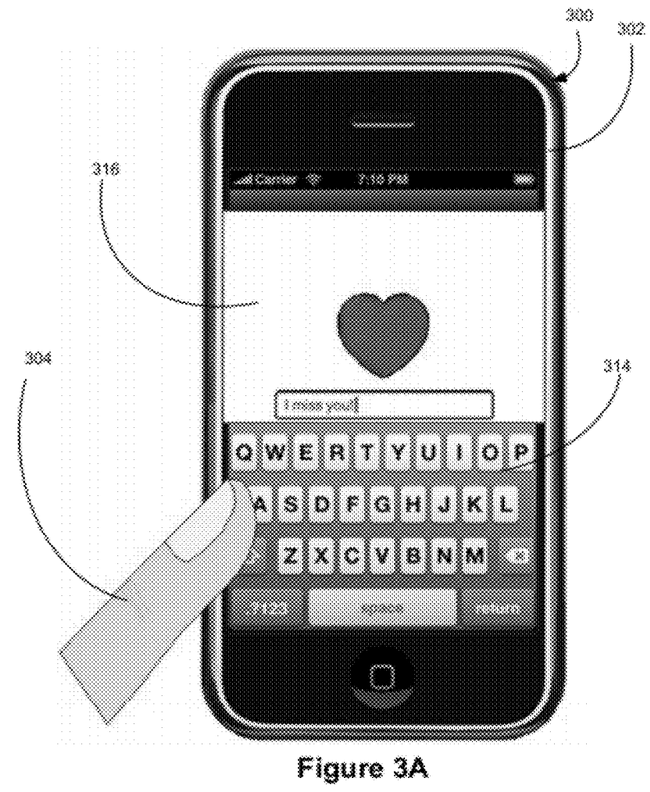
FIG. 3A is an illustration of a system for pre-touch and true touch according to one embodiment of the present invention.

FIG. 3A is an illustration of a system for pre-touch and true touch according to one embodiment of the present invention. FIG. 3A comprises a handheld device 300, such as a mobile phone, PDA, portable media player, or portable gaming device. The handheld device 300 is configured to send and receive signals, such as voicemail, text messages, and other data messages, over a network such as a cellular network or the Internet. The handheld device 300 comprises a wireless network interface and/or a wired network interface (not shown in FIG. 3A). Although the device 300 is illustrated as a handheld device in FIG. 3A, other embodiments may comprise different devices, such as video game systems and/or personal computers.

As shown in FIG. 3A, the handheld device 300 comprises a housing 302 and a display 316. In some embodiments, display 316 may comprise an LCD display. In other embodiments, display 316 may comprise a plasma display, or other type of display known in the art. Display 316 is configured to receive display signals from the processor and output them to the user. In the embodiment shown in FIG. 3A, display 316 comprises a graphical user interface comprising a virtual QWERTY keyboard, a heart, and a text box.

Referring still to FIG. 3A, the handheld device 300 further comprises a touch-sensitive interface 314. In the embodiment shown in FIG. 2, touch-sensitive interface 314 comprise a touch-screen positioned overtop of display 316. Touch-sensitive interface 314 is configured to detect two types of user interaction and transmit interface signals corresponding to the user interaction to processor 110. First touch-sensitive interface 314 is configured to detect a pre-touch. A pre-touch may comprise user interaction prior to the user making physical contact with the surface of touch-sensitive interface 314. For example, as shown in FIG. 3A, user's finger 304 is moving towards touch-sensitive interface 314. In the embodiment shown in FIG. 3A, touch-sensitive interface 314 may detect the user interaction prior to the user's finger 304 making physical contact with touch-sensitive interface 314. For example, in some embodiments, touch-sensitive interface 314 may detect the user's finger 304 when it is just a few millimeters over the surface of touch-sensitive interface 314, e.g. within 5 mm. In other embodiments, touch-sensitive interface 314 will detect the user's finger 304 when it is a few centimeters over the surface touch-sensitive interface 314, for example within 5 cm. In other embodiments, touch-sensitive interface 314 may detect a pre-touch when the user has made contact with touch-sensitive interface 314, but when less than a threshold area of skin is in contact with touch-sensitive interface 314. In other embodiments, touch-sensitive interface may detect a pre-touch when it detects a user interaction for less than a threshold period of time, for example, less than 0.02 seconds. When touch-sensitive interface 314 detects a pre-touch, it transmits a first interface signal to processor 110.

When processor 110 receives the first interface signal associated with the pre-touch, processor 110 determines a haptic effect. Then processor 110 transmits a haptic signal to a cache (not shown in FIG. 3A) configured to preload the haptic signal. In some embodiments, the cache may comprise a memory, such as a RAM, ROM, EEPROM, or other type of memory known in the art. In such an embodiment, preloading the haptic signal may comprise storing the haptic signal in memory. In other embodiments, the cache may comprise a battery, capacitor, inductor, or some other energy storage means. In such an embodiment, preloading the haptic signal may comprise storing the energy necessary to generate the haptic effect. In still other embodiments, the cache may comprise a means for storing mechanical energy, for example, flywheel or a spring. In such an embodiment, preloading the haptic signal may comprise rotating the flywheel or preloading the spring. In still other embodiments, the cache may comprise the haptic effect generator itself. In such an embodiment, preloading the haptic signal comprises powering a haptic effect generator to a point below the point where the user can feel a haptic effect. For example, preloading the haptic signal may comprise powering the haptic effect generator to a point just below the power that breaks the coefficient of static friction within the haptic effect generator. In such an embodiment, transmitting the haptic signal may comprise applying additional power to the haptic effect generator, thereby causing the haptic effect generator to output the haptic effect. In such an embodiment, the additional power may comprise substantially the full power of the haptic signal.

Figure 3B:
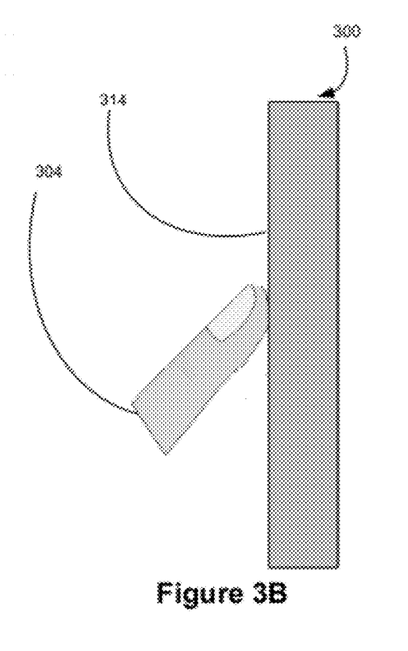
FIG. 3B is an illustration of a system for pre-touch and true touch according to one embodiment of the present invention.

FIG. 3B is an illustration of a system for pre-touch and true touch according to one embodiment of the present invention. FIG. 3B comprises a side view of the handheld device 300, also shown in FIG. 3A. In the embodiment shown in FIG. 3B, the user's finger 304 has made physical contact with touch-sensitive interface 314. When user's finger 304 makes physical contact with touch-sensitive interface 314, it detects a true touch. In other embodiments, touch-sensitive interface 314 may not detect a true touch until a certain threshold area of skin is in contact with touch-sensitive interface 314. For example, when more than 0.2 cm$^2$ is in contact with touch-sensitive interface 314. In other embodiments, touch-sensitive interface 314 may detect a true touch when the user has been in contact with touch-sensitive interface 314 for more than a threshold period of time, for example, more than 0.02 seconds. When touch-sensitive interface detects a true touch, it transmits a second interface signal to processor 110.

When processor 110 receives the second interface signal, processor 110 transmits a signal to the cache configured to cause the cache to transmit the haptic signal to the haptic effect generator, which then outputs the haptic effect. In an embodiment wherein the cache comprises a memory, transmitting the haptic signal comprises transmitting the haptic signal to the haptic effect generator. In an embodiment wherein the cache comprises an energy storage device such as a battery, inductor, or capacitor, transmitting the haptic signal comprises outputting the energy to the haptic effect generator. In an embodiment wherein the cache comprises a flywheel, transmitting the haptic signal comprises transmitting a signal to a brake configured to slow the speed of the haptic effect generator, outputting a torque on the handheld device. In an embodiment wherein the cache comprises the haptic effect generator, transmitting the haptic signal to the haptic effect generator comprises activating the haptic effect generator at the power necessary to generate the haptic effect.

In some embodiments, after detecting the pre-touch, touch-sensitive interface 314 may never detect a true touch. In such an embodiment, processor 110 may be configured to wait a predetermined time period, and then send an instruction to the cache to discharge the haptic effect slowly. For example, slowly discharging the contents of a capacitor, slowly slowing the speed of the flywheel, or deleting the haptic signal stored in a memory. In such an embodiment, the cache is discharged without outputting the haptic effect.

Illustrative Methods for Pre-Touch and True Touch

Figure 4:
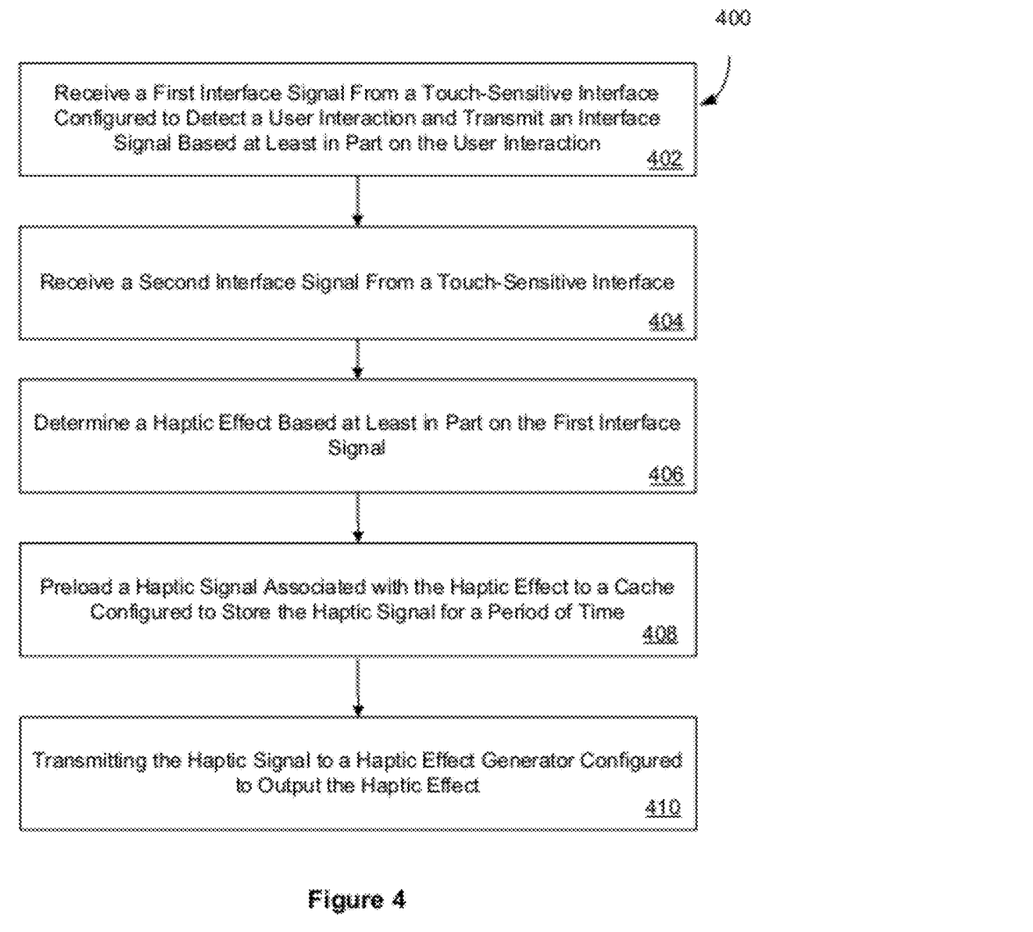
FIG. 4 is a flow chart of a method for pre-touch and true touch according to one embodiment of the present invention.

FIG. 4 is a flow chart for a method of pre-touch and true touch according to one embodiment of the present invention. The method 400 shown in FIG. 4 is described with reference to the system shown in FIG. 1. The method 400 begins when processor 110 receives an interface signal from touch-sensitive interface 114, which is configured to detect a user interaction and transmit an interface signal based at least in part on the user interaction 402. In some embodiments, touch-sensitive interface 114 comprises a touch-pad or a touch-screen. In some embodiments, the touch-sensitive interface is mounted overtop of a display. The touch-sensitive interface 114 is configured to detect two types of user interaction, a pre-touch and a true touch. The pre-touch may comprise user interaction above the surface of touch-sensitive interface 114 that does not make contact with the surface of touch-sensitive interface 114. For example, in one embodiment, the user may use the touch-sensitive interface to interact with a virtual keyboard. In such an embodiment, touch-sensitive interface 114 may detect a pre-touch when the user's finger is a few millimeters over the surface of the touch-screen, for example 5 millimeters or less. In other embodiments touch-sensitive interface 114 may detect the user interaction further from its surface, for example when the user interaction is within 3 centimeter or more. In still other embodiments, touch-sensitive interface 114 may detect a pre-touch when it detects user contact that has not yet lasted for over a threshold period of time, for example less than 0.02 seconds. In yet another embodiment, touch-sensitive interface 114 may detect a pre-touch when it detects user contact, but less than a threshold area of skin is in contact with touch-sensitive interface 114, for example, less than 0.2 cm$^2$ of skin.

Next, touch-sensitive interface 114 transmits a second interface signal and processor 110 receives the second interface signal 404. Touch-sensitive interface 114 is configured to transmit the second interface signal to processor 110, based at least in part on a true touch. A true touch may comprise user interaction that results in physical contact between the user and the touch-sensitive interface, for example, when the user places a finger on the surface of the touch-sensitive interface. In other embodiments, touch-sensitive interface 114 may not detect a true touch until a certain threshold area of skin is in contact with touch-sensitive interface 114. For example, when more than 0.2 cm$^2$ is in contact with touch-sensitive interface 114. In other embodiments, touch-sensitive interface 114 may detect a true touch when the user has been in contact with touch-sensitive interface 114 for more than a threshold period of time, for example, more than 0.02 seconds.

Then, processor 110 determines a haptic effect based at least in part on the first interface signal 406. For example, in one embodiment, processor 110 may perform a series of algorithms to determine the appropriate haptic effect. In another embodiment, processor 110 may use a lookup table to determine the haptic effect. The haptic effect may comprise one of any haptic effect known in the art, for example, a vibration, a torque, a knocking, a clicking, or a haptic effect configured to generate a texture or a friction.

Next, processor 110 preloads a haptic signal associated with the haptic effect to cache 124, which is configured to store haptic signal for a period of time 408. In some embodiments, the period of time is fixed, for example a time of 10 ms. In other embodiments, the period of time may be a fixed period of time that is longer or shorter than 10 ms. In still other embodiments, the period of time is defined by the length of time between the pre-touch and the true touch. For example, in some embodiments processor 110 transmits the haptic signal to cache 124 after the touch-sensitive interface detects the pre-touch. Then, cache 124 stores the haptic signal until processor 110 receives an interface signal associated with the true touch from touch-sensitive interface 114. In some embodiments, the cache may comprise memory, such as RAM, Flash, ROM, configured processor or some other memory known in the art. In other embodiments, cache 124 may comprise a means for storing mechanical energy, for example, a spring or a flywheel. In such an embodiment, storing the haptic effect comprises rotating the flywheel and outputting the haptic effect comprises applying a brake to the flywheel. In still other embodiments, the cache and the haptic effect generator may comprise a single component. In such an embodiment, preloading the haptic signal may comprise powering the haptic effect generator to a level just below the point where the haptic effect generator outputs a perceptible haptic effect. For example, in such an embodiment, preloading the haptic signal may comprise powering the haptic effect generator to the point just below the level necessary to break the haptic effect generator's coefficient of static friction.

Finally, cache 124 transmits the haptic signal to an haptic effect generator 118 configured to output the haptic effect 410. In some embodiments, cache 124 transmits the haptic signal to haptic effect generator 118 after receiving the second interface signal from touch-sensitive interface 114. For example, after touch-sensitive interface 114 detects a true touch. In some embodiments, Haptic effect generator 118 may be, a piezoelectric actuator, an electric motor, an electro-magnetic actuator, a voice coil, a linear resonant actuator, a shape memory alloy, an electro-active polymer, a solenoid, an eccentric rotating mass motor (ERM), or a linear resonant actuator (LRA). In some embodiments, the cache may receive a signal from processor 110, and based on that signal transmit the haptic signal to the haptic effect generator. In other embodiments, the cache may be in communication with touch-sensitive interface 114. In such an embodiment, the touch-sensitive interface may transmit the second interface signal, associated with the true touch, to the cache. In such an embodiment, the cache will transmit the haptic signal to the haptic effect generator when it receives the second interface signal.

In embodiments wherein the cache comprises different components, transmitting the haptic signal may comprise different operations. For example, in an embodiment wherein the cache comprises a memory, transmitting the haptic signal comprises transmitting the haptic signal to the haptic effect generator. In an embodiment, wherein the cache comprises an energy storage device such as a battery, inductor, or capacitor, transmitting the haptic signal comprises outputting the energy to the haptic effect generator. In an embodiment wherein the cache comprises a flywheel, transmitting the haptic signal comprises transmitting a signal to a brake configured to slow the speed of the haptic effect generator, outputting a torque on the handheld device. In an embodiment wherein the cache comprises the haptic effect generator, transmitting the haptic signal to the haptic effect generator comprises activating the haptic effect generator at the power necessary to generate the haptic effect.

Illustrated Embodiments of Systems for Pre-Touch and True Touch

Figure 5:
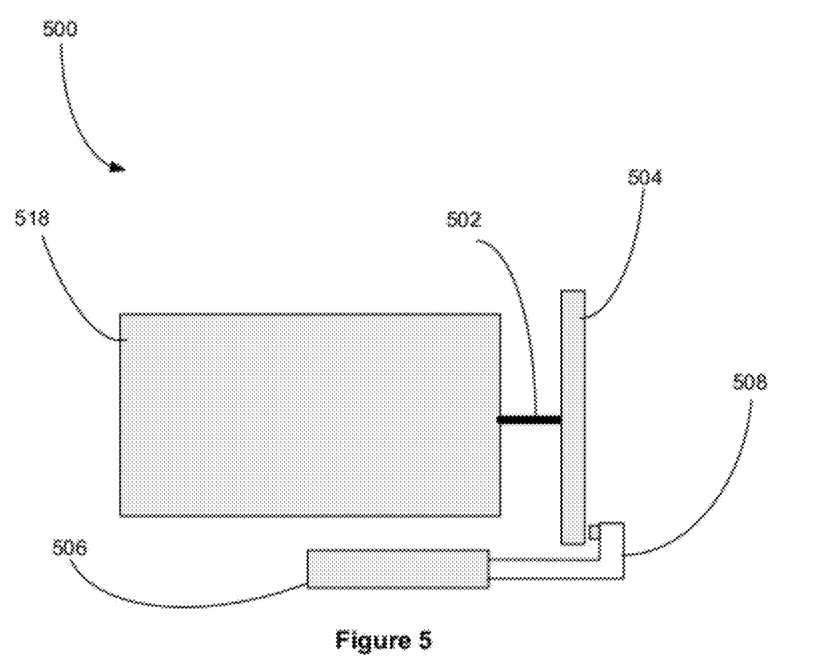
FIG. 5 is an illustration of a system for pre-touch and true touch according to one embodiment of the present invention.

FIG. 5 is an illustration of a system for pre-touch and true touch according to one embodiment of the present invention. FIG. 5 comprises system 500, which is configured to be mounted inside the housing of a handheld device according to one embodiment of the present invention. The system 500 is configured to receive a haptic signal from processor 110 and in response output a haptic effect. System 500 comprises an actuator 518, which is connected to axle 502, and flywheel 504. System 500 further comprises a braking mechanism 506 and brake 508 configured to stop the flywheel.

According to one embodiment of the present invention, when processor 110 receives a first interface signal associated with a pre-touch, processor 110 will determine a haptic effect. Then processor 110 will preload the haptic signal to a cache configured to store the haptic signal. In the embodiment shown in FIG. 5, the cache comprises flywheel 504, and preloading the cache comprises spinning flywheel 504. Accordingly, when processor 110 transmits, or preloads, the haptic signal to the cache, actuator 518 rotates axle 502, which then rotates flywheel 504. In order to prevent the handheld device from receiving a torque, actuator 518 may be configured to slowly accelerate flywheel 504 up to speed, thereby preventing a noticeable torque on the handheld device.

When processor 110 receives the second interface signal, associated with a true touch, from the touch-sensitive interface, processor 110 transmits a second signal to braking mechanism 506. In response, braking mechanism 506 pulls brake 508 against flywheel 504, thus slowing flywheel 504. When flywheel 504 is slowed, it outputs a torque on the housing that actuator 518 is mounted to. The strength of the torque is associated with how rapidly flywheel 504 is slowed. Thus, braking mechanism 506 may be configured to apply varying pressures on flywheel 508 in order to provide varying levels of torque. For example, processor 110 may determine a weak haptic effect. In such an embodiment braking mechanism may slow flywheel 504 only slightly, thereby outputting a minimal torque. In other embodiments, processor 110 may determine a strong haptic effect. In such an embodiment, braking mechanism may slow flywheel to a complete stop in less than a rotation and thereby output a very strong torque.

Advantages of Systems for Pre-Touch and True Touch

Systems and methods of pre-touch and true touch provide many advantages. For example, systems and methods of pre-touch and true touch allow devices to output more compelling haptic effects because they allow the handheld device to output the haptic effect more quickly. This reduces the risk that the user will have already removed their fingers from the device when the effect is output. Further, systems and methods of pre-touch and true touch provide greater flexibility in component selection in haptic devices. For example, a slower processor may be used because there is less risk that a system utilizing systems and methods of pre-touch and true touch will output a haptic effect after the user has stopped touching the system. Similarly, a less powerful haptic effect generator may be required because systems and methods of pre-touch and true touch require less acceleration from the haptic effect generator to generate the haptic effect on time. All of these benefits may lead to greater satisfaction and faster adoption of devices that incorporate systems and methods for pre-touch and true touch.

General Considerations

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A system comprising:
    a touch-sensitive interface configured to:
        detect a first user interaction within a first threshold distance from the touch-sensitive interface;
        transmit a first interface signal associated with the first user interaction;
        detect a second user interaction when greater than a second threshold area of a user's skin contacts the touch-sensitive interface; and
        transmit a second interface signal associated with the second user interaction;
    a processor in communication with the touch-sensitive interface and configured to:
        receive the first interface signal;
        determine a haptic effect based at least in part on the first interface signal; and
        preload a haptic signal associated with the haptic effect;
    a cache in communication with the processor and configured to store the preloaded haptic signal and transmit the haptic signal based in part on the second interface signal; and
    a haptic effect generator in communication with the cache and configured to receive the haptic signal from the cache and output a haptic effect based at least in part on the haptic signal.

2. The system of claim 1, wherein the touch-sensitive interface comprises a touch-screen.

3. The system of claim 1, wherein the cache comprises a memory.

4. The system of claim 1, wherein the cache comprises one of: a capacitor, an inductor, or a battery.

5. The system of claim 1, wherein:
    the cache comprises a flywheel, and
    storing the haptic signal comprises rotating the flywheel.

6. The system of claim 5, further comprising a flywheel brake and wherein outputting the haptic effect comprises slowing the flywheel.

7. The system of claim 1, further comprising a sensor configured to detect a user interaction above a surface of the touch-sensitive interface and transmit a sensor signal to the processor corresponding to the user interaction.

8. The system of claim 7, wherein the sensor comprises one of: an optical sensor, an infrared sensor, or a motion sensor.

9. The system of claim 1, further comprising a housing configured to contain the processor, the cache, and the haptic effect generator.

10. The system of claim 9, wherein the housing comprises a handheld device housing.

11. The system of claim 9, wherein the haptic effect generator is configured to output the haptic effect onto the housing.

12. The system of claim 1, wherein the first threshold comprises an area of contact greater than 0.02 cm$^2$.

13. The system of claim 1, wherein the second threshold comprises a distance of less than 3 cm from the touch-sensitive interface.

14. A method for generating a haptic effect comprising:
    detecting a first user interaction within a first threshold distance from a touch-sensitive interface;
    transmitting a first interface signal associated with the first user interaction;
    detecting a second user interaction when greater than a second threshold area of a user's skin contacts the touch-sensitive interface;
    transmitting a second interface signal associated with the second user interaction;
    determining a haptic effect based at least in part on the first interface signal;
    preloading a haptic signal associated with the haptic effect to a cache configured to store the haptic signal;
    transmitting the haptic signal based in part on the second interface signal; and
    outputting a haptic effect based at least in part on the haptic signal.

15. The method of claim 14, wherein the haptic signal is transmitted to the haptic effect generator after receiving the second interface signal.

16. The method of claim 14, wherein the first threshold comprises an area of contact greater than 0.02 cm$^2$.

17. The method of claim 14, wherein the second threshold comprises a distance of less than 3 cm from the touch-sensitive interface.

18. A non-transient computer readable medium comprising program code, which when executed by a processor is configured to cause the processor to:
    detect a first user interaction within a first threshold distance from a touch-sensitive interface;
    transmit a first interface signal associated with the first user interaction;
    detect a second user interaction when greater than a second threshold area of a user's skin contacts the touch-sensitive interface;

transmit a second interface signal associated with the second user interaction determine a haptic effect based at least in part on the interface signal;

preload a haptic signal associated with the haptic effect to a cache configured to store the haptic signal; and transmit the stored haptic signal based in part on the second interface signal; and output a haptic effect based at least in part on the haptic signal.

19. The computer readable medium of claim 18, wherein the first threshold comprises an area of contact greater than 0.02 cm$^2$.

20. The computer readable medium of claim 18, wherein the second threshold comprises a distance of less than 3 cm from the touch-sensitive interface.

* * * * *